(12) United States Patent
Sakamoto

(10) Patent No.: US 6,710,939 B2
(45) Date of Patent: Mar. 23, 2004

(54) OBJECTIVE LENS FOR OPTICAL PICK-UP DEVICE AND OPTICAL PICK-UP DEVICE

(75) Inventor: Katsuya Sakamoto, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/292,068

(22) Filed: Nov. 12, 2002

(65) Prior Publication Data

US 2003/0193724 A1 Oct. 16, 2003

(30) Foreign Application Priority Data

Nov. 15, 2001 (JP) ........................ 2001-349931

(51) Int. Cl.[7] .......................... G02B 13/04; G02B 3/08; G11B 7/00
(52) U.S. Cl. ................... 359/719; 359/743; 369/112.01; 369/122.23
(58) Field of Search ................. 359/642, 719, 359/824, 742, 743; 369/112.01, 122.23, 44.23

(56) References Cited

U.S. PATENT DOCUMENTS

| | | | | |
|---|---|---|---|---|
| 6,115,192 A | * | 9/2000 | McDonald | 359/708 |
| 6,313,956 B1 | * | 11/2001 | Saito | 359/721 |
| 6,363,037 B1 | * | 3/2002 | Yamazaki | 369/112.26 |
| 6,366,542 B1 | * | 4/2002 | Kojima et al. | 369/44.23 |
| 6,411,442 B1 | * | 6/2002 | Ota et al. | 359/642 |
| 6,512,640 B2 | * | 1/2003 | Ota et al. | 359/719 |
| 6,614,600 B2 | * | 9/2003 | Kojima | 359/719 |
| 2003/0103272 A1 | * | 6/2003 | Ota et al. | 359/719 |

* cited by examiner

*Primary Examiner*—Ricky Mack
(74) *Attorney, Agent, or Firm*—Cohen, Pontani, Lieberman & Pavane

(57) ABSTRACT

An objective lens is provided with plural optical functional regions including an inside optical functional region, an outside optical functional region and an intermediate optical functional region provided between the inside and outside optical functional regions. The absolute value of an amount of a spherical aberration of a light flux coming to the second optical information recording medium after having passed through the intermediate optical functional region is made larger than that of an amount of a spherical aberration of a light flux coming to the second optical information recording medium after having passed through the inside optical functional region when recording and/or reproducing information is conducted for the second optical information recording medium.

16 Claims, 11 Drawing Sheets

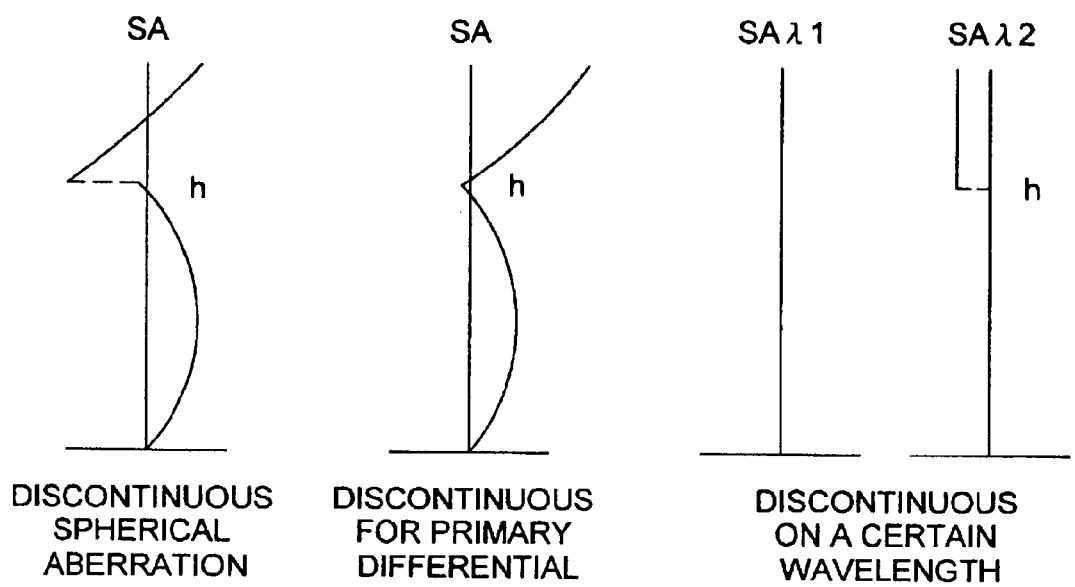

FIG. 10(a)
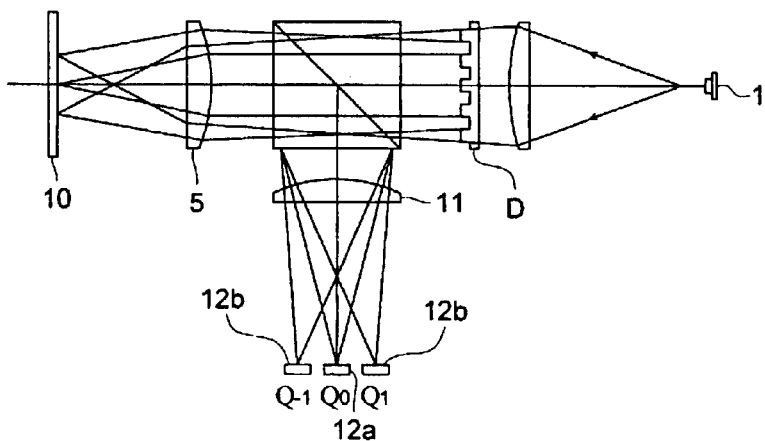
FIG. 10(b)
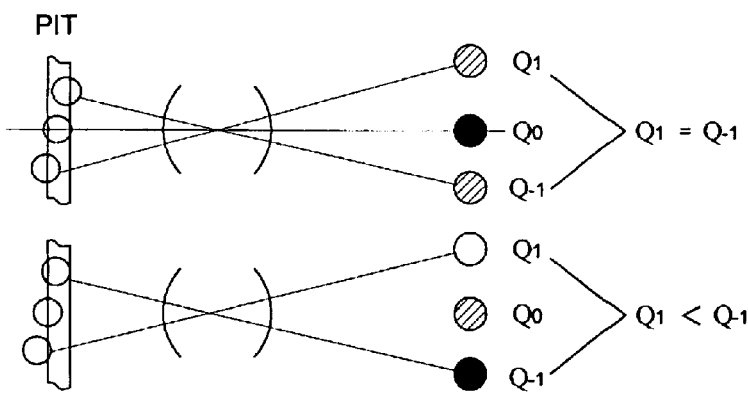
FIG. 10(c)
FIG. 11(a)
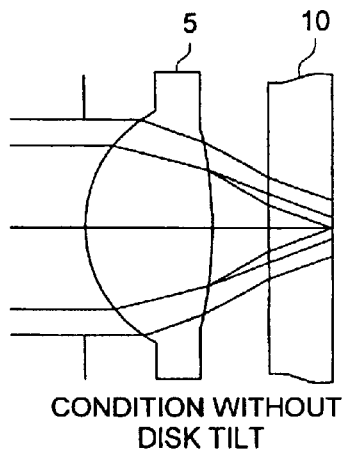
CONDITION WITHOUT
DISK TILT
FIG. 11(b)
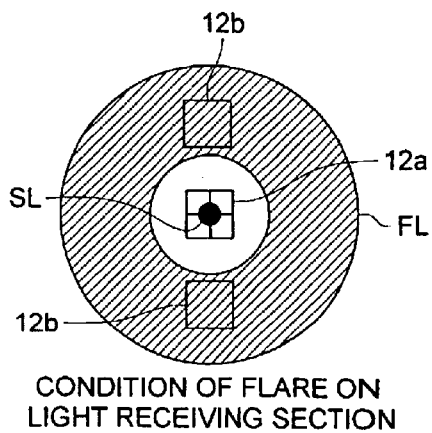
CONDITION OF FLARE ON
LIGHT RECEIVING SECTION

CONDITION WITH DISK TILT

CONDITION OF FLARE ON
LIGHT RECEIVING SECTION

OBJECTIVE LENS FOR OPTICAL PICK-UP DEVICE AND OPTICAL PICK-UP DEVICE

BACKGROUND OF THE INVENTION

The present invention relates to an objective lens used for an optical pick-up device and an optical pick-up device, and in particular, to an objective lens for performing recording/reproduction for optical information recording media which are different in recording density, and an optical pick-up device.

At present, there exist many kinds of optical information recording media, and the standards of these optical information recording media are established as shown in Table 1. Incidentally, hereafter (including lens data in the table), the power value of ten (for example, $2.5 \times 10^{-3}$) is expressed by E (for example, $2.5 \times E-3$).

TABLE 1

| Optical disk | Thickness of transparent base board (mm) | Necessary numerical aperture NA (wave-length of light source λ nm) |
| --- | --- | --- |
| CD, CD-R (reproduction) | 1.20 | 0.45 (λ = 780 nm) |
| CD-R (recording, reproduction) | 1.20 | 0.50 (λ = 780 nm) |
| DVD | 0.60 | 0.60 (λ = 635 nm) |

Here, as the optical information recording media which are different in the recording density and required to have an interchangeability each other, there are CD and DVD. As shown in TABLE 1, these optical information recording media are different in the thickness of the transparent base board. In order to secure the interchangeability, it is necessary to correct, by any means, a spherical aberration generated by the difference of the thickness of the transparent base boards. Further, since DVD and CD are different each other in the required numerical aperture, some measures are necessary.

As the example which secures the interchangeability between DVD and CD by the objective lens, the objective lens having therein a diffractive structure is developed. As the above-mentioned objective lens, for example, there is the one in which the different diffractive structures are provided at the inside and outside of the specified distance h from the optical axis on one of the surfaces of the optical lens, and the spherical aberration is corrected for the thickness of each of the transparent base boards in an inside area, while the spherical aberration is corrected only for DVD in an outside area, and the spherical aberration is not corrected for CD, but is flared. By constructing the objective lens in the manner mentioned above, it is possible to form appropriately a light converging spot that is required for recording or reproducing of information on each optical information recording medium.

Here, concerning the flare on the outside area when CD is used, the case of an over flare and the case of an under flare are conceivable. In the case of under flare, the design makes a diffractive efficiency to be strong, causing a tendency that diffractive pitch is narrow. Accordingly, it is preferable in the design that the over flare is adopted from the view point of the diffractive efficiency.

In the optical pick-up device, an optical detecting device is generally used for judging whether the recording or reproduction of information is performed certainly or not. The optical detecting device detects the information recording light that is reflected on the surface of the optical information recording medium, and based on the result of the detection, the optical detecting device judges whether an error is caused or not. Here, the normal optical detecting device is composed of a main light receiving section, and sub light receiving sections provided on both sides of the main light receiving section, and mainly the main light receiving section reads the information recording light, while the sub light receiving section detects a tracking error.

As mentioned above, in the case that an optical surface of the objective lens is divided into two areas and the spherical aberration is corrected for the thickness of each of the transparent base boards in the inside area, while the spherical aberration is corrected only for DVD in the outside area, and that the spherical aberration is not corrected but flared for CD, a boundary of the flare light does not cover the main light receiving section and a pair of the sub light receiving sections of the optical detecting device. Accordingly, it can be said that any special problem might not happen, as far as the optical information recording media and optical detecting device are manufactured on the basis of design values.

However, in the optical information recording media, from the problem of a parts-incorporating error, when there happens the so-called disk tilt meaning that an axial line of CD is tilted to the axial line of the light converging optical system, or the so-called lens shift meaning that both of the axial lines are shifted, there is the danger that there happens a phenomenon that the boundary of the flared light is changed or the form of the flared light is distorted. The optical detecting device has essentially a function by which the tracking error is watched on the basis of the difference of the amounts of light received by the paired sub light receiving sections. However, when the above-mentioned phenomenon happens, there is the danger that an error signal is outputted, even if the tracking error does not occur.

The present invention has been achieved in view of the above-mentioned problems, and the object of the present invention is to provide an objective lens for an optical pick-up device and an optical pick-up device which can perform the recording or reproduction of information adequately for the different optical information recording media, though the construction is simple.

SUMMARY OF THE INVENTION

The objective lens for the optical pick-up device mentioned in Structure (1) is one, having a first light source having the wavelength of λ1 and performing the recording or reproduction of information by radiating the light flux on a first optical information recording medium having the thickness of a transparent base board of t1, a second light source having the wavelength of λ2 (λ1<λ2) and performing the recording or reproduction of information by radiating the light flux on a second optical information recording medium having the thickness of the transparent base board of t2 (t1<t2), a light converging optical system including an objective lens which converges the light flux irradiated from the above-mentioned first and second light sources on information recording surfaces through transparent base boards of the first and second optical information recording media, and an optical detecting device,
wherein there are arranged three or more optical function areas in the direction to cross the optical axis, diffractive structures are formed on an inner optical function area located at the side near the optical axis and an outer optical function area located at the side farther from the optical axis respectively, the light flux passing through the inner optical function area is corrected in terms of spherical aberration caused, when conducting the recording or reproduction for the first and second optical information recording medium, the light flux passing through the outer optical function area is corrected in terms of the spherical aberration caused, when conducting the recording or reproduction for the first optical information recording medium, and further, is flared, when conducting the recording or reproduction for the second optical information recording medium, the spherical aberration of the light flux having passed through an intermediate optical function area located between the inner optical function area and the outer optical function area is discontinuous to the spherical aberration of the light flux having passed through the outer optical function area, when conducting the recording or reproduction for the second optical information recording medium, further, the absolute value of the amount of-the spherical aberration of the light flux having passed through the intermediate optical function area and arriving at the second optical information recording medium, when conducting the recording or reproduction for the second optical information recording medium, is greater than the absolute value of the amount of the spherical aberration on the light flux having passed through the inner optical function area and arriving at the second optical information recording medium, when conducting the recording or reproduction for the second optical information recording medium, and the following formula is satisfied, when an image-forming magnification of the objective lens, in conducting the recording or reproduction of information for the first optical information recording medium, is set to m1.

$$-0.1 < m1 < 0.1 \quad (1)$$

Incidentally, in the present specification, "the spherical aberration is corrected by the optical function area" means that the spherical aberration of the light flux (light source wavelength $\lambda$) passing through the optical function area is not greater than 0.07 $\lambda$ rms. Further, "the spherical aberration is discontinuous" includes every discontinuous condition which will be stated later referring to FIG. 1.

In the objective lens for the optical pick-up device mentioned in Structure (2), when an image-forming magnification of the objective lens, in conducting recording or reproduction of information for the second optical information recording medium, is set to m2, the following formula is satisfied.

$$|m1-m2|<0.05 \quad (2)$$

In the objective lens for the optical pick-up device mentioned in Structure (3), when wave front aberration of a first effective light flux radiated from the first light source, in conducting the recording or reproduction of information for the first optical information recording medium, is set to $SA_1$, the following formula is satisfied.

$$|SA_1|<0.01 \ \lambda 1 \text{ rms} \quad (3)$$

In the objective lens for the optical pick-up device mentioned in Structure (4), when wave front aberration of a second effective light flux radiated from the second light source, in conducting the recording or reproduction of information for the second optical information recording medium, is set to $SA_2$, the following formula is satisfied.

$$|SA_2|<0.01 \ \lambda 2 \text{ rms} \quad (4)$$

In the objective lens for the optical pick-up device mentioned in Structure (5), when the amount of vertical spherical aberration of the light ray passing through the outer most section of the second effective light flux, in conducting the recording or reproduction of information for the second optical information recording medium, is $LSA_2h_2$, and when the amount of vertical spherical aberration of the light ray passing through the outer most section of the second effective light flux, in conducting the recording or reproduction of information for the first optical information recording medium, is $LSA_1h_2$, $$|LSA_2h_2|+|LSA_1h_2|<0.01 \text{ mm} \quad (5)$$

In the objective lens for the optical pick-up device mentioned in Structure (6), the light flux passing through the intermediate optical function area is flared, when conducting the recording or reproduction of information for the second optical information recording medium.

In the objective lens for the optical pick-up device mentioned in Structure (7), the light flux (intermediate light flux) passing through the intermediate optical function area has the under spherical aberration, when conducting the recording or reproduction of information for the second optical information recording medium.

In the objective lens for the optical pick-up device mentioned in Structure (8), the light flux passing through the intermediate optical function area is corrected in terms of the spherical aberration, when conducting the recording or reproduction of information for the first optical information recording medium.

The optical pick-up device mentioned in Structure (9) is one, having a first light source having the wavelength of $\lambda 1$ and performing the recording or reproduction of information by radiating the light flux on a first optical information recording medium having the thickness of a transparent base board of t1, a second light source having the wavelength of $\lambda 2$ ($\lambda 1 < \lambda 2$) and performing the recording or reproduction of information by radiating the light flux on a second optical information recording medium having the thickness of the transparent base board of t2 (t1<t2), a light converging optical system including an objective lens which converges the light flux irradiated from the above-mentioned first and second light sources on information recording surfaces through transparent base boards of the first and second optical information recording media, and an optical detecting device, wherein in the above-mentioned objective lens, there are arranged three or more optical function areas in the direction to cross the optical axis, diffractive structures are formed on an inner optical function area located at the side near the optical axis and an outer optical function area located at the side farther from the optical axis respectively, the light flux passing through the inner optical function area is corrected in terms of spherical aberration caused when the recording or reproduction for the first and second optical information recording medium is performed, the light flux passing through the outer optical function area is corrected in terms of the spherical aberration caused when conducting the recording or reproduction for the first optical information recording medium, and further, is flared when conducting the recording or reproduction for the second optical information recording medium, the spherical aberration of the light flux having passed through an intermediate optical function area located between the first optical function area and the second optical function area is discontinuous to the spherical aberration of the light flux having passed through the outer optical function area, when conducting the recording or reproduction for the second optical information recording medium, further, the absolute value of the amount of the spherical aberration of the light flux having passed through the intermediate optical function area and arriving at the second optical information recording medium when conducting the recording or reproduction for the second optical information recording medium is greater than the absolute value of the amount of the spherical aberration on the light flux having passed through the inner optical function area and arriving at the second optical information recording medium when the recording or reproduction for the second optical information recording medium is performed, and the following formula is satisfied, when an image-forming magnification of the objective lens in conducting the recording or reproduction of information for the first optical information recording medium is set to m1.

$$-0.1 < m1 < 0.1 \quad (6)$$

Incidentally, in the present specification, "the spherical aberration is corrected by the optical function area" means that the spherical aberration of the light flux (light source wavelength $\lambda$) passing through the optical function area is not greater than 0.07 $\lambda$rms. Further, "the spherical aberration is discontinuous" includes every discontinuous condition which will be stated later referring to FIG. 1.

In the optical pick-up device mentioned in Structure (10), when an image-forming magnification of the objective lens in conducting recording or reproduction of information for the second optical information recording medium is set to m2, the following formula is satisfied.

$$|m1-m2| < 0.05 \quad (7)$$

In the optical pick-up device mentioned in Structure (11), when wave front aberration of a first effective light flux radiated from the first light source when conducting the recording or reproduction of information for the first optical information recording medium is set to $SA_1$, the following formula is satisfied.

$$|SA_1| < 0.01 \ \lambda 1 \ \text{rms} \quad (8)$$

In the optical pick-up device mentioned in Structure (12), when wave front aberration of a second effective light flux radiated from the second light source when conducting the recording or reproduction of information for the second optical information recording medium is set to $SA_2$, the following formula is satisfied.

$$|SA_2| < 0.01 \ \lambda 2 \ \text{rms} \quad (9)$$

In the optical pick-up device mentioned in Structure (13), when the amount of vertical spherical aberration of the light ray passing through the outer most section of the second effective light flux in conducting the recording or reproduction of information for the second optical information recording medium is $LSA_2h_2$, and when the amount of vertical spherical aberration of the light ray passing through the outer most section of the second effective light flux in conducting the recording or reproduction of information for the first optical information recording medium is $LSA_1h_2$, $$|LSA_2h_2| + |LSA_1h_2| < 0.01 \ \text{mm} \quad (10)$$

In the optical pick-up device mentioned in Structure (14), the light flux passing through the intermediate optical function area is flared, when conducting the recording or reproduction of information for the second optical information recording medium.

In the optical pick-up device mentioned in Structure (15), the light flux (intermediate light flux) passing through the intermediate optical function area has the under spherical aberration, when conducting the recording or reproduction of information for the second optical information recording medium.

In optical pick-up device mentioned in Structure (16), the light flux passing through the intermediate optical function area is corrected in terms of the spherical aberration, when conducting the recording or reproduction of information for the first optical information recording medium.

In the present specification, when "an optical function area" shown by spherical aberration is applicable to either one of the following conditions, it is regarded that the different optical function areas exist across the boundary of h.

(a) Spherical aberration is discontinuous at h (FIG. 1(a)).

(b) Spherical aberration is continuous at h, but the primary differential is discontinuous at h (FIG. 1(b)).

(c) Spherical aberration is discontinuous on a certain wavelength (FIG. 1(c)).

Further, an area, where each light flux divided by the above-mentioned conditions passes through, is regarded as "an optical function area". Due to this, when a refraction section and a diffraction section (diffractive structure) exist on one surface of a lens, the different "optical function areas" exist across the boundary of the refraction section and the diffraction section (See FIGS. 2(a) and 2(c)). Still further, though the diffractive structure is formed on the whole surface, when the diffractive structures designed on the basis of the different object are co-existed, they are regarded as the different "optical function areas" by the above-mentioned condition (c) (See FIG. 2(b)). Still further, when the discontinuous section is formed on the one surface, they are regarded as the different optical surfaces, though an aspheric surface expressed by the same aspheric coefficient is formed on the other surface. Incidentally, it is necessary that three or more optical function areas are arranged (FIGS. 2(a)–2(c)).

Concerning "an under spherical aberration or over spherical aberration", when the spherical aberration crosses the optical axis before the paraxial image point, it is called "under", while when the spherical aberration crosses the optical axis beyond the paraxial image point, it is called "over", on the spherical aberration having the origin on a paraxial image point position as shown in FIG. 3.

"A diffractive structure" in the present specification means the section on the surface of the objective lens where there is provided a relief that has a function to converge or diverge the light flux by diffraction. As a form of the relief, there is known a form that is formed on the surface of objective lens OL as a ring-shaped zone that is nearly concentric on the center of an optical axis as shown in FIG. 2(b) for example, and when its section on a plane including the optical axis is viewed, each ring-shaped zone is formed to be like a saw-tooth. The relief includes the above-mentioned form, and the form is called "a diffractive ring-shaped zone" particularly.

In the present specification, the objective lens in the narrow sense means a lens that is located closest to the optical information recording medium side to face it, and has a light converging function, under the condition that the optical information recording medium is loaded to the optical pick-up device. The objective lens in the broad sense means a lens group that can be moved by an actuator together with the aforementioned lens, at least in the optical axial direction. Here, the lens group means one or more pieces of lenses (for example, two pieces). Accordingly, in the present specification, numerical aperture NA of the objective lens on the optical information recording medium side (that is image side) means the numerical aperture NA of the lens surface of the objective lens positioned closest to the optical information recording medium side. Still further, in the present specification, necessary numerical aperture NA means the numerical aperture stipulated in the specification of each optical information recording medium, or it means the numerical aperture of the objective lens having a diffraction limit power that can obtain a spot diameter necessary for recording or reproducing information in accordance with the wavelength of the light source in use, for each optical information recording medium.

In the present specification, the second optical information recording medium means, for example, the optical disks of various kinds of CD systems such as CD-R, CD-RW, CD-Video, and CD-ROM, while the first optical information recording medium means the optical disks of various kinds of DVD systems such as DVD-ROM, DVD-RAM, DVD-R, DVD-RW, and DVD-Video. Further, the thickness t of the transparent base board in the present specification includes the case of t=0.

BRIEF DESCRIPTION OF THE DRAWINGS

FIGS. 1(a) to 1(c) each is a drawing showing a discontinuous condition of spherical aberration.

FIGS. 10(a) to 10(c) are drawings for illustrating the operations of an optical detecting device.

FIGS. 11(a) and 11(b) are drawings for illustrating a disk tilt.

DETAILED DESCRIPTION OF THE PREFERRED EMBODIMENT

Figure 2A:
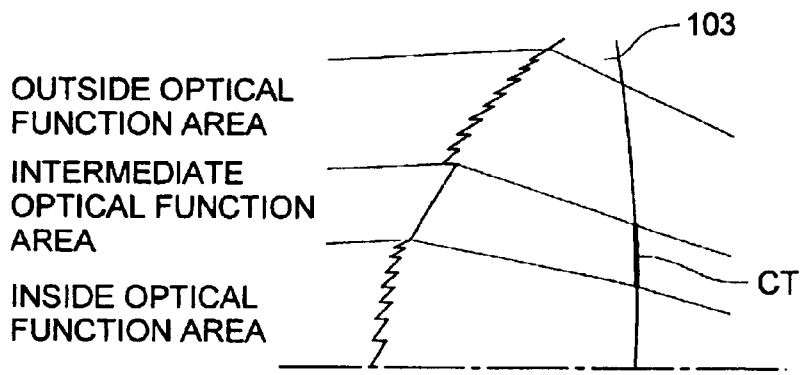
FIGS. 2(a)–2(c) are sections of an objective lens for explaining an optical surface area.

Preferred embodiments of the present invention will be described in detail below, referring to the drawings.

First, the optical detecting device is described. FIG. 10 is a drawing for describing the function of an optical detecting device, FIG. 10(a) is a schematic drawing showing an example of the light pick-up device, and FIGS. 10(b) and 10(c) are drawings showing a light receiving condition of the light receiving section.

In the optical pick-up device, so-called tracking servo movement is conducted in a manner that a pit (a small area where information is written), wandering on the rotating optical information recording medium (a disk), is followed so that the spot image through the objective lens 5 is positioned on the center axis of the pit. When a diffraction grating D is arranged on the light path of laser beam entering the objective lens 5 as shown in FIG. 10(a), as one of the tracking servo method, the laser beam radiated from light source 1 is diffracted and divided into the directions of a zero-order and ±first order.

Here, in the diffraction grating D, when distance (grating constant) between gratings is represented by d, and wavelength of the light source is represented by $\lambda$, a diffraction angle of the ±first order light is shown by $\theta=\pm\lambda/d$. These diffracted light are converged by the objective lens 5, and create three spot images of the zero-order and ±first order, on the surface of disk 10, as shown in FIG. 10(a). When t represents the distance, and f represents a focal length of the objective lens 5, t is shown by the expression $t=f\theta=\pm f\cdot\lambda/d$.

The three spot images are arranged so that a spot image for the zero-order light is on the central axis of the pit, and the spot images for the ±first order light are on the edge of the pit, then the light returned by diffraction are caused again by the objective lens 5 to form images, and main light receiving section 12a and sub light receiving sections 12b of the optical detecting device 12 are arranged at the positions of respective image spots. If the pit is positioned correctly, amounts $Q_1$ and $Q_{-1}$ of light received by a pair of the sub light receiving sections 12b are equal in principle, as shown in FIG. 10(b). However, if the pit is shifted as shown in FIG. 10(c), the light amount $Q_{-1}$ is greater than the light amount $Q_1$, and the shift amount of the pit can be found on the basis of this difference, resulting in that the tracking servo is conducted by a feed-back control.

Figure 12:
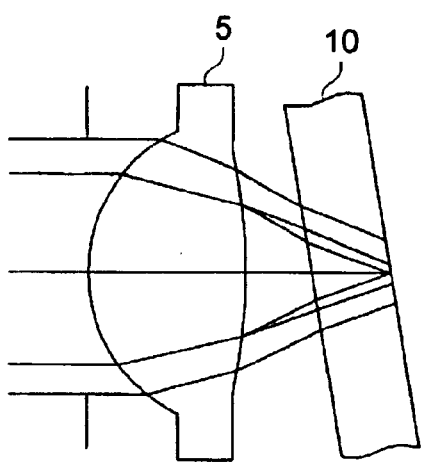
FIGS. 12(a) and 12(b) are drawings for illustrating a disk tilt.
Figure 12:
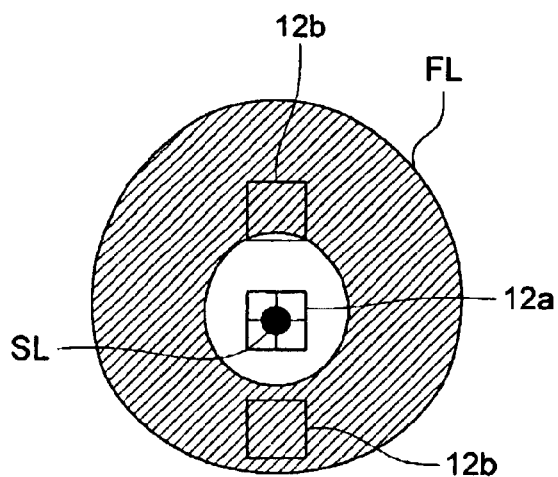

FIGS. 11(a) and 11(b) and FIGS. 12(a) and 12(b) are drawings for describing a disk tilt, that is, FIG. 11(a) and FIG. 12(a) are sections of the objective lens, and FIG. 11(b) and FIG. 12(b) are drawings showing the light receiving condition of the light receiving detector. Here, there are provided the intermediate optical function area and the outer optical functional area in the objective lens 5, and when only the outer optical function area is set so that it forms the flared light for recording or reproducing for CD, flared light FL being circular shape covers the sub light receiving sections 12b as shown in FIG. 11(b), but amounts $Q_1$ and $Q_{-1}$ of the light received by the sub light receiving sections 12b are nearly equal, and thereby the influence to the tracking servo is avoided.

However, when the disk 10 is tilted as shown in FIG. 12(a), the distance between the objective lens 5 and the disk 10 changes in proportion to the direction of the pit line. Accordingly, the distance between the disk 10 and the sub light receiving section 12b of the optical detecting device changes in proportion to the direction of the pit line. Consequently as shown FIG. 12(b), the form of the flared light FL changes and causes the difference between amounts $Q_1$ and $Q_{-1}$ of light received by the sub light receiving sections 12b, and there is danger that it is fallibly detected as the tracking error. This is because, since the flared light FL is continuous and spreads out on the over side, the flared light FL, belonging to the side where the distance between the objective lens 5 and the disk 10 is shorter, goes away from the spot light SL, while the flared light, belonging to the side where the distance between the objective lens 5 and the disk 10 is longer, comes near the spot light SL.

For this problem, in the first embodiment, the objective lens 5 is divided into three optical function areas so that the spherical aberration of the light flux passing through the intermediate optical function area and the spherical aberration of the light flux passing through the outer optical function area can be made to be discontinuous, when the information recording or reproduction for CD is performed. By this construction, when the information recording or reproduction is performed for CD, it is possible to perform the design wherein the light flux passing through the intermediate optical function area has the under spherical aberration, and the light flux passing through the outer optical function has the over spherical aberration. When the disk tilt occurs due to the under spherical aberration and over spherical aberration, the flared light FL, which is over and belongs to the side where the distance between the objective lens 5 and the disk 10 is shorter, goes away from the spot light SL, and the flared light FL which is under comes near the spot light SL, by the under spherical aberration and over spherical aberration. On the other hand, the flared light FL, which is over and belongs to the side where the distance between the objective lens 5 and the disk 10 is longer, comes near the spot light SL, and the flared light FL which is under goes away from the spot light SL. That is, though the disk tilt occurs, the influence on the tracking servo can be avoided, because amounts $Q_1$ and $Q_{-1}$ of the light received by the sub light receiving sections 12b are nearly equal. The objective lens mentioned above corresponds to Examples 2, 3 and 5 mentioned later.

Further, for the above-mentioned problem that there occurs the difference between amounts $Q_1$ and $Q_{-1}$ of the light received by the sub light receiving sections 12b when the disk tilt occurs, the objective lens 5 is divided into three optical function areas so that the spherical aberration of the light flux passing through the intermediate optical function area and the spherical aberration of the light flux passing through the outer optical function area can be made to be discontinuous, when the information recording or reproduction for CD is performed in the second embodiment. By this construction, when the information recording or reproduction is performed for CD, it is possible to perform the design wherein the light flux passing through the intermediate optical function area has the over spherical aberration, and the light flux passing through the outer optical function has the over spherical aberration that is over than the light flux passing through the intermediate optical function area. In this case, by the manner that the light flux passing through the intermediate optical function area converges on the ring shaped zone around the main light receiving section 12a between the main light receiving section 12a and the sub light receiving section 12b, and by the manner that the light flux passing through the outer optical function area converges on the outside of the sub light receiving section 12b around the main light receiving section 12a, the flared light FL can be prevented from covering the sub light receiving section 12b, resulting in that the influence on the tracking servo can be avoided. The objective lens mentioned above corresponds to Example 1 mentioned later.

Still further, for the above-mentioned problem that there occurs the difference between amounts $Q_1$ and $Q_{-1}$ of the light received by the sub light receiving sections 12b when the disk tilt occurs, the objective lens 5 is divided into three optical function areas so that the spherical aberration of the light flux passing through the intermediate optical function area and the spherical aberration of the light flux passing through the outer optical function area can be made to be discontinuous, when the information recording or reproduction for CD is performed in the third embodiment. By this construction, when the information recording or reproduction is performed for CD, it is possible to perform the design wherein the light flux passing through the outer optical function area has the over spherical aberration, and the light flux passing through the intermediate optical function area has the over spherical aberration that is over than the light flux passing through the outer optical function area. In this case, by the manner that the light flux passing through the intermediate optical function area converges on the ring shaped zone around the main light receiving section 12a between the main light receiving section 12a and the sub light receiving section 12b, and by the manner that the light flux passing through the outer optical function area converges on the outside of the sub light receiving section 12b around the main light receiving section 12a, the flared light FL can be prevented from covering the sub light receiving section 12b, resulting in that the influence on the tracking servo can be avoided. The objective lens mentioned above corresponds to Example 4 which will be mentioned later.

The following can be mentioned commonly in the above-mentioned embodiments, that is, when an image forming magnification of the objective lens 5 for the information recording or reproduction for DVD is represented by m1 and an image forming magnification of the objective lens 5 for the information recording or reproduction for CD is represented by m2, if the formula (2) is satisfied, the light source 1 having two light emitting points on a single tip can be employed. In this case, it is desirable from the view point of down sizing that the optical detecting device 12 and the light source 1 are provided on the same base board.

Still further, for the information recording or reproduction for DVD, when the wave front aberration of the first effective light flux emitted from the light source is represented by $SA_1$, if the formula (3) is satisfied, the recording or reproduction for DVD can be appropriately performed, even when the spherical aberration is changed by the change of temperature.

Still further, for the information recording or reproduction for CD, when the wave front aberration of the first effective light flux emitted from the light source is represented by $SA_2$, if the formula (4) is satisfied, the recording or reproduction for CD can be adequately performed, even when the spherical aberration is changed by the change of temperature.

Figure 4:
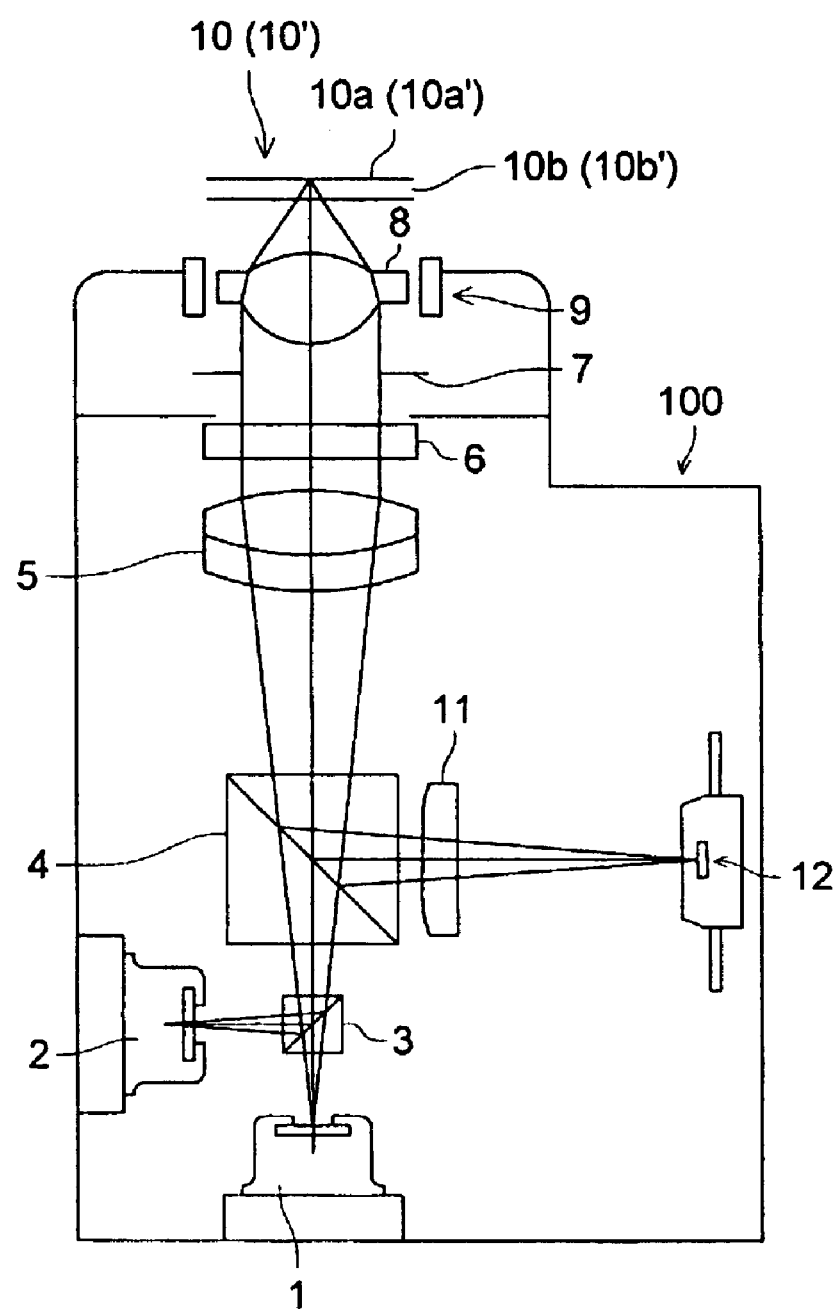
FIG. 4 is a schematic structural diagram of an optical pick-up device of a present embodiment.

The fourth embodiment is described in the following. Here, there is shown an example wherein two pieces of the light sources are arranged separately. As mentioned above, it is preferable that the objective lens of the present invention is employed for the optical pick-up device having two light sources on a single base board. FIG. 4 is a schematic structural drawing of optical pick-up device 100 including the objective lens of the fourth embodiment. The optical pick-up device 100 of the present embodiment can perform the information recording and/or reproduction for two or more types of optical disks each having a different thickness of the transparent base board. In the optical pick-up device 100 of the present invention, the above-mentioned plural optical disks are described in the order of the height of the recording density, concerning the first optical disk (DVD) having the thickness t1 of the transparent base board, and the second optical disk (CD) having the thickness t2 different from t1 of the transparent base board, however the optical disks are not limited to them. Here, the thickness of the transparent base boards are t1=0.6 mm and t2=1.2 mm, and the necessary numerical apertures of the objective lenses are differently established as shown in the example.

The optical pick-up device 100 of the present embodiment has first semiconductor laser 1 (wavelength $\lambda_1$=610 nm–670 nm, incidentally in the example described later, 655 nm or 660 nm) for the first optical disk as the first light source, and second semiconductor laser 2 (wavelength $\lambda_2$=740 nm–870 nm, incidentally in the example described later, 685 nm) for the second optical disk as the second light source. These first semiconductor laser 1 and the second semiconductor laser 2 are used selectively in accordance with the optical disk for which the information recording and/or reproduction is performed. Further, combining means 3 is a means that can combine the light flux emitted from the first semiconductor laser 1 and the light flux emitted from the second semiconductor laser 2.

Firstly, when information recorded in the first optical disk 10 having the thickness of t1 is reproduced, the light flux is emitted from the first semiconductor laser, and the emitted light flux passes through combining means 3, polarization beam splitter 4, collimator lens 5, and quarter-wave plate 6, and is formed to be circularly polarized parallel light flux. This light flux is stopped down by diaphragm 7, and is converged by the objective lens 8 on recording surface 10*a* through transparent base board 10*b* of the first optical disk. The light flux modulated and reflected on an information pit of the recording surface passes again through the objective lens 8, the quarter-wave plate 6, and the collimator lens 5, and enters the polarization beam splitter 4, then the light flux is reflected here, and is given astigmatism by cylindrical lens 11, and enters optical detecting device 12, thus a read-out signal for information recorded in the first optical disk 10 is obtained by signal outputted from the optical detecting device 12. Incidentally, the light receiving device 12 has a main light receiving section and paired sub light receiving sections arranged on both sides of the main light receiving section, which are not illustrated.

Further, a focusing detection and tracking detection are conducted by detecting the change of the distribution of light amount caused by the change of the form of the spot on the optical detecting device 12. On the basis of the detection, two-dimensional actuator 9 moves the objective lens 8 so that the light flux emitted from the first semiconductor laser 1 may form an image on the recording surface 10*a* of the first optical disk 10, and further moves the objective lens 8 so that the light flux emitted from the first semiconductor laser 1 may form an image on the predetermined track.

On the other hand, when information recorded on second optical disk 10' having the thickness of t2 (t1<t2) of the transparent base board is reproduced, the light flux is emitted from the second semiconductor laser 2, and the emitted light flux, whose light path is changed by the combining means 3, passes through polarization beam splitter 4, collimator lens 5, quarter-wave plate 6, diaphragm 7, and objective lens 8, and is converged on the recording surface 10*a'* through transparent base board 10*b* of the second optical disk 10'. The light flux modulated and reflected on an information pit of the recording surface 10*a'* passes again through the objective lens 8, the quarter-wave plate 6, the collimator lens 5, the polarization beam splitter 4, and the cylindrical lens 11, and enters the optical detecting device 12, thus a read-out signal for information recorded on the second optical disk 10' is obtained by signal outputted from the optical detecting device 12.

Further, the focusing detection and tracking detection are conducted by detecting the change of the distribution of light amount caused by the change of the form of the spot on the optical detecting device 12. On the basis of the detection, two-dimensional actuator 9 moves the objective lens 8 so that the light flux emitted from the second semiconductor laser 2 may form an image on the recording surface 10*a'* of the second optical disk 10', and moves the objective lens 8 so that the light flux emitted from the second semiconductor laser 2 may form an image on the predetermined track. Operation which are mostly the same as those in the foregoing are conducted when information is recorded on the first optical disk 10 or second optical disk 10'.

In the optical pick-up device 100, as mentioned above, when information is reproduced for the first optical disk 10 having the thickness t1 of the transparent base board, such as DVD (t1=0.6 mm), for example, the objective lens 8 is moved by the two-dimensional actuator 9 so that the beam spot may form a circle of least confusion (best focus).

By using this objective lens 8, when the reproduction is performed for the second optical disk 10', having the thickness t2 of the transparent base board, different from t1 (t2>t1), and having recording density lower than that of the first optical disk 10, such as CD (t2=1.2 mm), the spherical aberration is generated by the difference in the thickness of the transparent base boards, and the spot size becomes so large that it is impossible to read (reproduce) the pit information of the second optical disk 10' at the position (that is at the back side of a paraxial focus position) where the beam spot becomes a circle of least confusion.

However, at the front side position (front focus) closer to the objective lens 8 than the position where the beam spot becomes the circle of least confusion, the flare, (the light flux having passed through the central and outer optical function areas of the objective lens 8) that is an unwanted light, is formed on and around a speck where the light amount is concentrated on the central section (the light flux having passed through the inner optical function area of the objective lens 8), though the size of the whole spot is larger than the circle of least confusion. The speck is used for reproducing the pit of the second optical disk 10', and when the information recorded on the second optical disk 10' is reproduced, the objective lens 8 is moved by the two-dimensional actuator 9 so that the objective lens 8 is in the defocus condition (front focus).

The optical pick-up device 100 of the present embodiment can converge the light emitted from each of the semiconductor lasers 1 and 2 on each of the recording surfaces 10*a* and 10*a'* respectively of the optical disks 10 and 10', through one objective lens 8, as mentioned above.

Figure 2B:
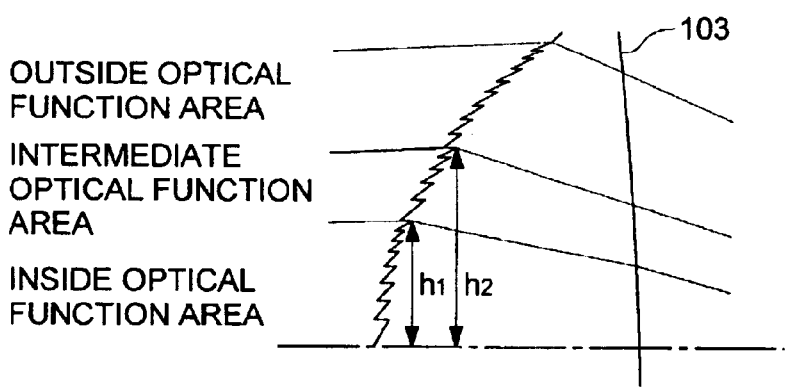
Figure 2C:
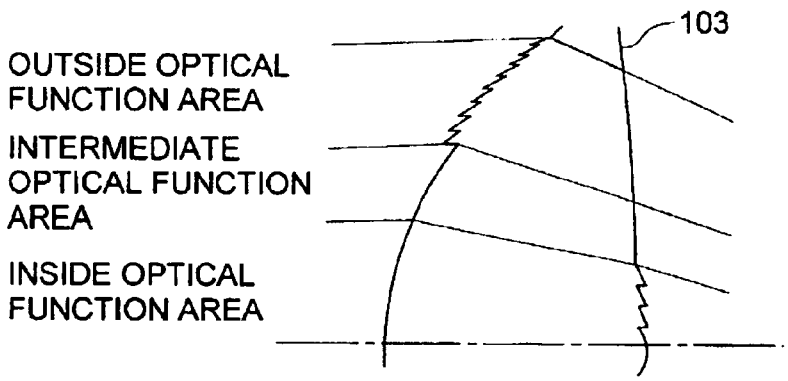
Figure 3:
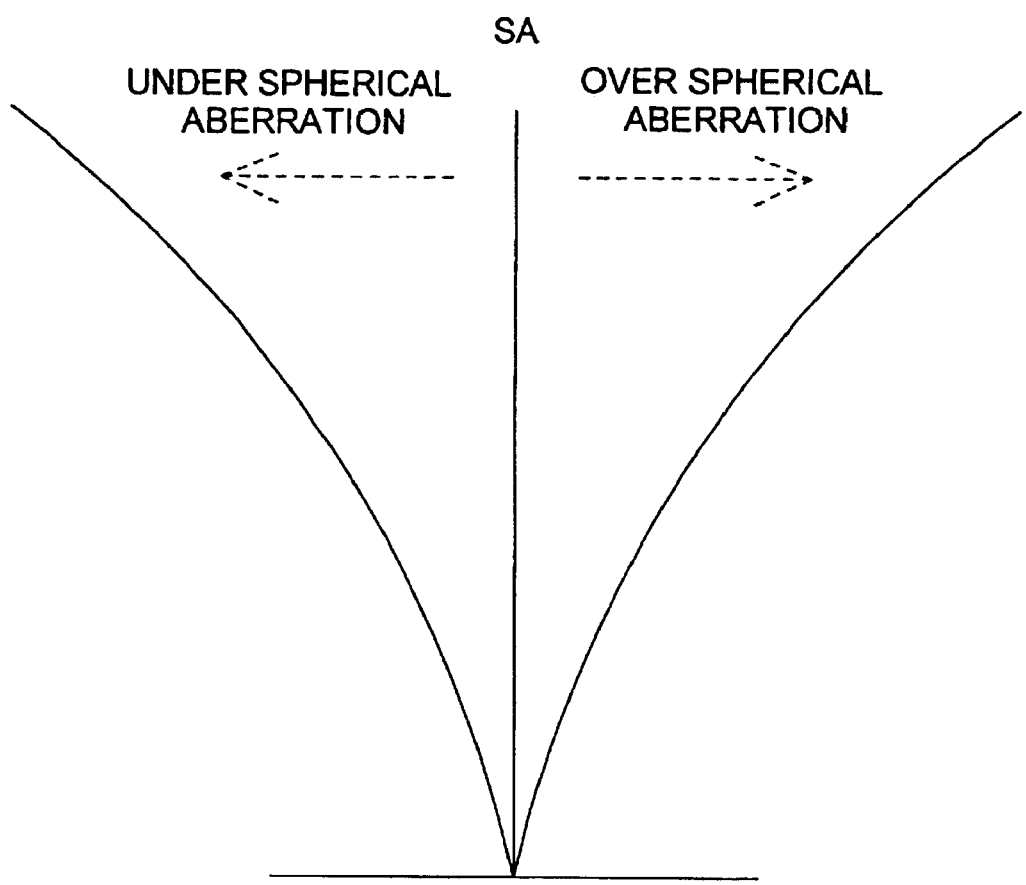
FIG. 3 is a drawing showing whether aberration is under or over.

The objective lens 8 is a plastic lens being aspheric on both surfaces, and there are provided three optical function areas each being different from others, divided by boundaries at the heights h1 and h2 from an optical axis (see FIG. 2(*b*)). The diffractive structure of the innermost inner optical function area is the one, wherein each of the spherical aberrations for using DVD and CD is corrected, and the diffractive order number is the same (the first diffractive number). Further, the diffractive structure of the outermost outer optical function area is the one wherein the spherical aberration for using DVD is corrected, and the spherical aberration for using CD is over-flared. The intermediate optical function area can be either a refractive surface or diffractive surface, but when CD is used, it is preferable that the light flux passing through the intermediate optical function area is under-flared. What is important is that a degree of freedom is improved in the design, because when DVD is used, the spherical aberration is corrected for the light flux passing through the intermediate optical function area, and when CD is used, the light flux is flared, independently of the light flux passing through the outer optical function area. That is, the light flux passing through the intermediate optical function area can be irradiated on the optional position on the light receiving section of the optical detecting device 12, and due to this, the detecting accuracy of the optical detecting device can be improved.

The examples preferable to the above-mentioned embodiments will be described in detail below.

Both of the surfaces of the objective lens are aspherical surfaces as shown by [Numeral 1]. Here, Z represents an axis in the direction to the optical axis, h represents an axis perpendicular to the optical axis, r represents a paraxial radius of curvature, $\kappa$ represents a constant of the cone, A represents a coefficient of the aspheric surface, and P represents a power value of the aspheric surface.

$$Z = \frac{h^2/R_0}{1+\sqrt{1-(1+\kappa)(h/R_0)^2}} + \sum_{i=1}^{\infty} A_i h^{P_i} \quad \text{[Expression 1]}$$

Further, the diffractive structure is formed solidly to be unitized on the surface of the aspheric surface of the light source side of the objective lens. This diffractive structure is expressed by Expression 2 with phase difference function $\Phi b$ whose unit is radian. The second-order coefficient shows paraxial power of the diffractive section. Further, the spherical aberration can be controlled by the co-efficient except for the second-order co-efficient, such as, for example, fourth-order co-efficient, or sixth-order co-efficient. Here, "to control" means to correct the spherical aberration totally, by making the spherical aberration of the refractive section to have the spherical aberration which has the opposite characteristics at the diffractive section, or means to manipulate the spherical aberration of the diffractive section and thereby to change the total spherical aberration to the desired flare amount. In this case, it can be considered that the spherical aberration during the change of temperature is also a total of the change of the spherical aberration of the refractive section caused by the change of temperature and the change of the spherical aberration of the diffractive section caused by the change of temperature.

$$\Phi_b = \sum_{i=1}^{\infty} b_{2i} h^{2i} \quad \text{[Expression 2]}$$

EXAMPLE 1

In the present example, on the light source side of the objective lens, there are formed the inner optical function area having the diffractive structure, the intermediate optical function area provided with the diffractive structure which gives the over spherical aberration to the passing light flux, and the outer optical function area provided with the diffractive structure.

Figure 5:
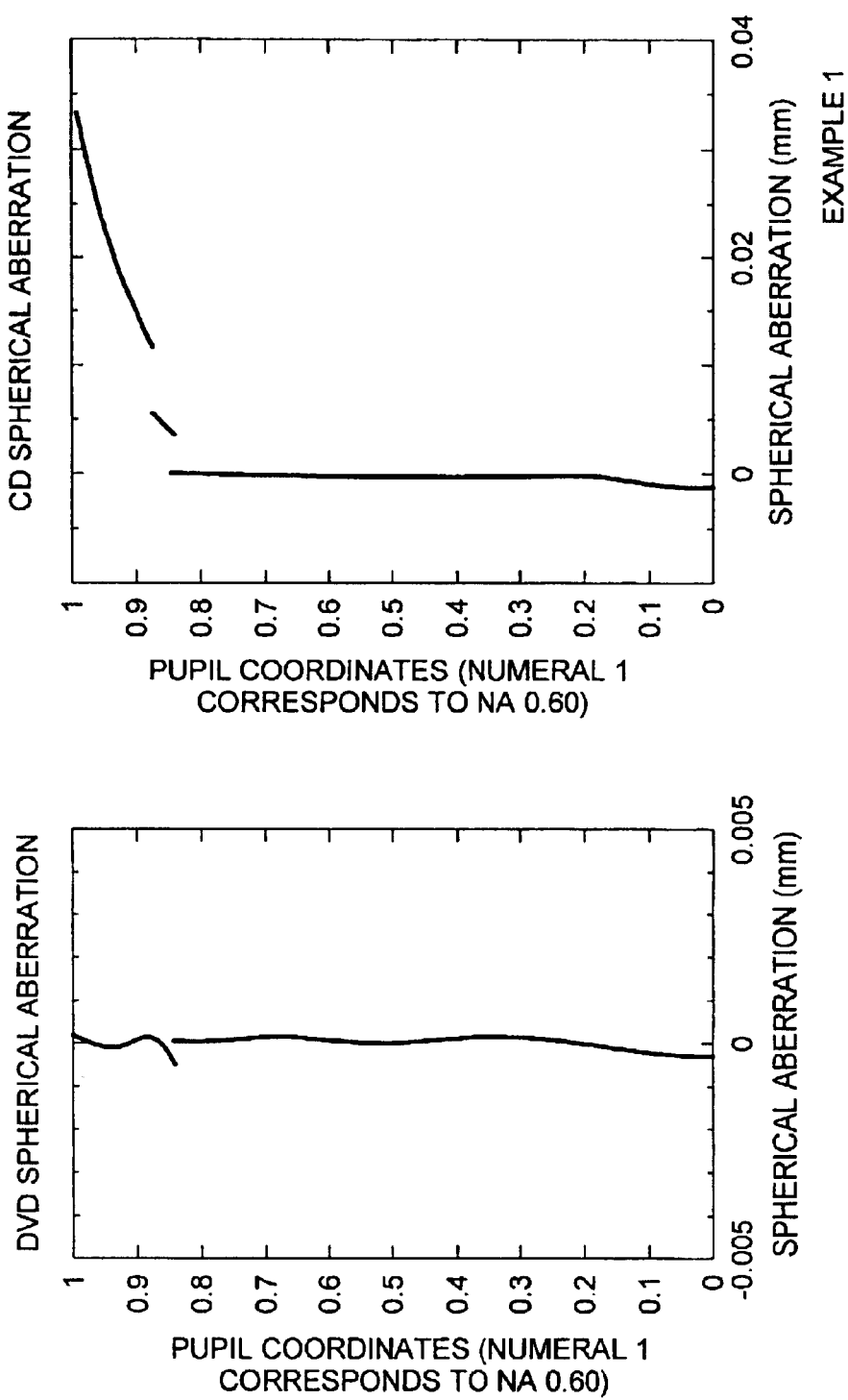
FIG. 5 is a spherical aberration diagram relating to an objective lens of Example 1.

The lens data of the objective lens relating to the present example is shown in Table 2. Further, for DVD and CD respectively, the spherical aberration drawings (shown by an amount of a longitudinal spherical aberration, hereinafter the same) of the objective lens of the present example are shown in FIG. 5. The amount of the wave-front aberration of the objective lens of the present invention is 0.004 $\lambda 1$ rms when DVD is used, while 0.001 $\lambda 2$ rms when CD is used.

TABLE 2

Example 1 lens data
$f_1 = 2.50$ mm, $f_2 = 2.52$ mm
NA1: 0.60, NA2: 0.50

| No. i surface | ri | di (655 nm) | ni (655 nm) | di (785 nm) | ni (785 nm) | |
|---|---|---|---|---|---|---|
| 0 | ∞ | | | ∞ | | |
| 1 | ∞ | 0.0 | 1.0 | 0.0 | 1.0 | diameter of diaphragm: 3.000 mm |
| 2 | 1.54021 | 1.21000 | 1.54094 | 1.21000 | 1.53716 | |
| 2' | 1.54214 | 1.21683 | 1.54094 | 1.21683 | 1.53716 | |
| 2" | 1.52017 | 1.22262 | 1.54094 | 1.22262 | 1.53716 | |
| 3 | −8.03006 | 1.43039 | 1.0 | 1.06287 | 1.0 | |
| 4 | ∞ | 0.6 | 1.57752 | 1.2 | 1.57063 | |
| 5 | ∞ | | | | | |

Aspherical Surface Data
No. 2 Surface (0<h<1.260 mm: DVD/CD common area)
Aspherical Surface Co-Efficient

| $\kappa$ | −1.3012 × E − 0 | | |
|---|---|---|---|
| A1 | +2.1485 × E − 2 | P1 | 4.0 |
| A2 | +3.2840 × E − 4 | P2 | 6.0 |
| A3 | −6.1242 × E − 4 | P3 | 8.0 |
| A4 | −4.7600 × E − 5 | P4 | 10.0 |

Optical path difference function (co-efficient of optical difference function: standard wavelength 730 nm)

C4 −4.6090×E−0

C6 −1.6704×E−0

C8 +3.5743×E−1

C10 −7.4761×E−2

No. 2' surface (1.260 mm<h<1.310 mm: DVD exclusive area)
Aspherical Surface Co-Efficient

| $\kappa$ | −6.4873 × E − 1 | | |
|---|---|---|---|
| A1 | +3.3233 × E − 2 | P1 | 4.0 |
| A2 | −3.7087 × E − 2 | P2 | 6.0 |

-continued

| | | | |
|---|---|---|---|
| A3 | $+1.3902 \times E - 2$ | P3 | 8.0 |
| A4 | $-1.6324 \times E - 3$ | P4 | 10.0 |
| A5 | $-1.1219 \times E - 4$ | P5 | 12.0 |

Optical path difference function (co-efficient of optical path difference function: standard wavelength 655 nm)

C2 $+6.1185 \times E-0$
C4 $-8.3947 \times E-0$
C6 $-1.9124 \times E-0$
C8 $+1.1724 \times E-0$
C10 $-1.6541 \times E-1$ No. 2" surface (1.310 mm<h: DVD exclusive area)
Aspherical Surface Co-Efficient

| κ | $-7.0588 \times E - 1$ | | |
|---|---|---|---|
| A1 | $+3.1031 \times E - 2$ | P1 | 4.0 |
| A2 | $-3.5492 \times E - 2$ | P2 | 6.0 |
| A3 | $+1.4047 \times E - 2$ | P3 | 8.0 |
| A4 | $-1.8207 \times E - 3$ | P4 | 10.0 |
| A5 | $-2.2631 \times E - 5$ | P5 | 12.0 |

Optical path difference function (co-efficient of optical path difference function: standard wavelength 655 nm)

C2 $+1.2299 \times E-1$
C4 $-4.3191 \times E-0$
C6 $-1.8563 \times E-0$
C8 $+3.0372 \times E-1$
C10 $+1.4514 \times E-1$ No. 3 surface
Aspherical Surface Co-Efficient

| κ | $-8.1183 \times E + 1$ | | |
|---|---|---|---|
| A1 | $+2.6945 \times E - 3$ | P1 | 4.0 |
| A2 | $+1.0688 \times E - 2$ | P2 | 6.0 |
| A3 | $-1.6756 \times E - 2$ | P3 | 8.0 |
| A4 | $+1.0634 \times E - 2$ | P4 | 10.0 |
| A5 | $-3.2442 \times E - 3$ | P5 | 12.0 |
| A6 | $+3.8176 \times E - 4$ | P6 | 14.0 |

EXAMPLE 2

In the present example, on the light source side of the objective lens, there are formed the inner optical function area having the diffractive structure, the intermediate optical function area provided with the diffractive structure which gives the under spherical aberration to the passing light flux, and the outer optical function area provided with the diffractive structure.

Figure 6:
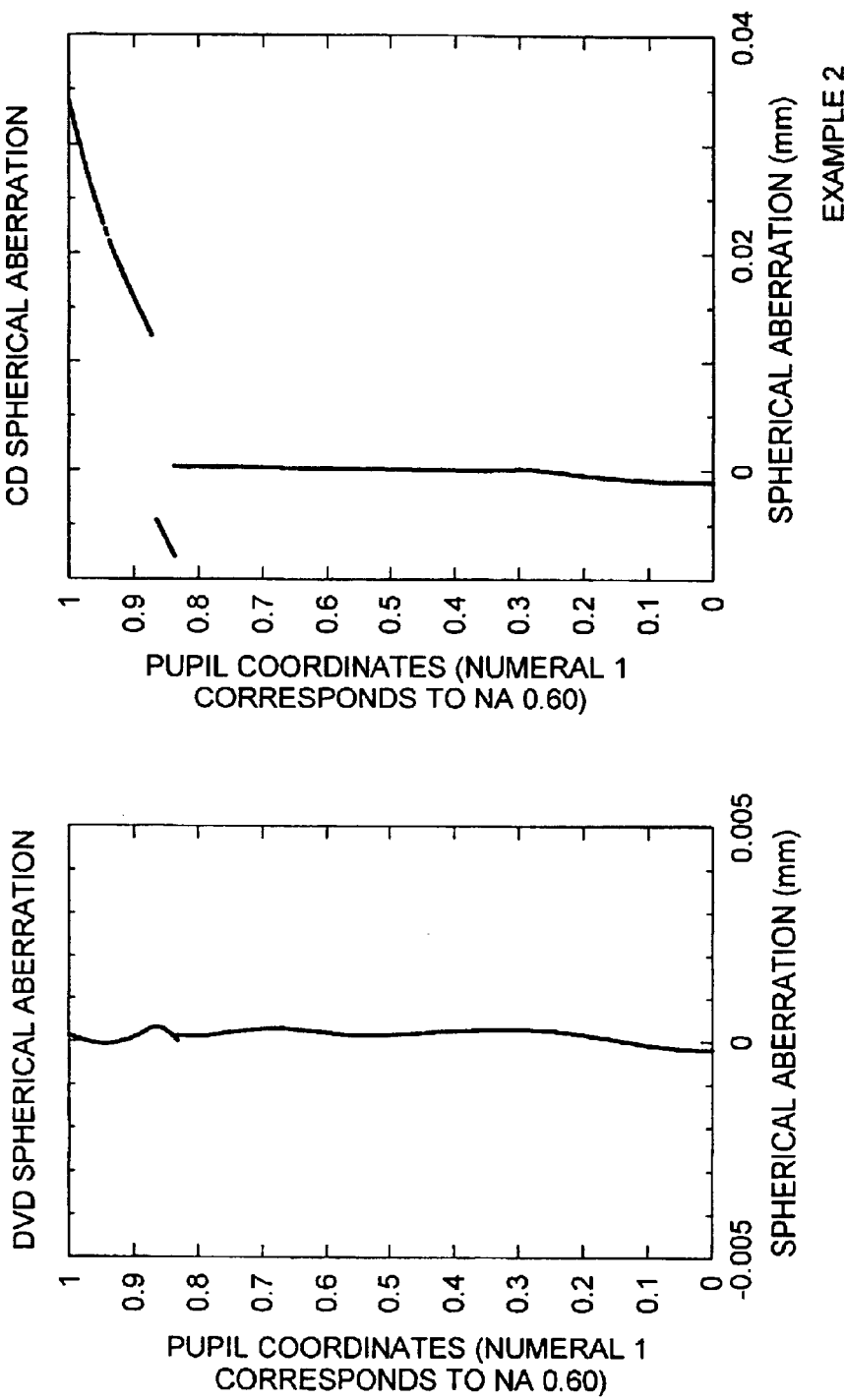
FIG. 6 is a spherical aberration diagram relating to an objective lens of Example 2.

The lens data of the objective lens relating to the present example is shown in Table 3. Further, for DVD and CD respectively, the spherical aberration drawings of the objective lens of the present example are shown in FIG. 6. The amount of the wave-front aberration of the objective lens of the present invention is 0.004 λ1 rms when DVD is used, while 0.001 λ2 rms when CD is used.

TABLE 3

Example 2 lens data
$f_1 = 2.50$ mm, $f_2 = 2.52$ mm
NA1: 0.60, NA2: 0.50

| No. i surface | ri | di (655 nm) | ni (655 nm) | di (785 nm) | ni 785 nm | |
|---|---|---|---|---|---|---|
| 0 | | ∞ | | ∞ | | |
| 1 | ∞ | 0.0 | 1.0 | 0.0 | 1.0 | diameter of diaphragm 3.000 mm |
| 2 | 1.54021 | 1.21000 | 1.54094 | 1.21000 | 1.53716 | |
| 2' | 1.48589 | 1.21354 | 1.54094 | 1.21354 | 1.53716 | |
| 2" | 1.52017 | 1.22262 | 1.54094 | 1.22262 | 1.53716 | |
| 3 | -8.03006 | 1.43039 | 1.0 | 1.06287 | 1.0 | |
| 4 | ∞ | 0.6 | 1.57752 | 1.2 | 1.57063 | |
| 5 | ∞ | | | | | |

Aspherical Surface Data
No. 2 surface(0<h<1.260 mm: DVD/CD common area)
Aspherical Surface Co-Efficient

| κ | $-1.3012 \times E - 0$ | | |
|---|---|---|---|
| A1 | $+2.1485 \times E - 2$ | P1 | 4.0 |
| A2 | $+3.2840 \times E - 4$ | P2 | 6.0 |
| A3 | $-6.1242 \times E - 4$ | P3 | 8.0 |
| A4 | $-4.7600 \times E - 5$ | P4 | 10.0 |

Optical path difference function (co-efficient of optical path difference function: standard wavelength 730 nm)

C4 $-4.6090 \times E-0$
C6 $-1.6704 \times E-0$
C8 $+3.5743 \times E-1$
C10 $-7.4761 \times E-2$ No. 2' surface (1.260 mm<h<1.310 mm: DVD exclusive area)
Aspherical Surface Co-Efficient

| κ | $-7.1053 \times E - 1$ | | |
|---|---|---|---|
| A1 | $+3.0610 \times E - 2$ | P1 | 4.0 |
| A2 | $-4.0789 \times E - 2$ | P2 | 6.0 |
| A3 | $+1.3040 \times E - 2$ | P3 | 8.0 |
| A4 | $-8.4244 \times E - 4$ | P4 | 10.0 |
| A5 | $-2.3273 \times E - 5$ | P5 | 12.0 | optical path difference function (co-efficient of optical path difference function: standard wavelength 655 nm)

C2 $+2.1039 \times E+1$
C4 $-1.5360 \times E+1$
C6 $-4.2774 \times E-0$
C8 $+8.7684 \times E-1$
C10 $+4.9768 \times E-1$ No. 2" surface (1.310 mm<h: DVD exclusive area)
Aspherical Surface Co-Efficient

| κ | $-7.0588 \times E - 1$ | | |
|---|---|---|---|
| A1 | $+3.1031 \times E - 2$ | P1 | 4.0 |
| A2 | $-3.5492 \times E - 2$ | P2 | 6.0 |
| A3 | $+1.4047 \times E - 2$ | P3 | 8.0 |

-continued

| | | | |
|---|---|---|---|
| A4 | $-1.8207 \times E - 3$ | P4 | 10.0 |
| A5 | $-2.2631 \times E - 5$ | P5 | 12.0 | optical path difference function (co-efficient of optical path difference function: standard wavelength 655 nm)

C2 +1.2299×E−1
C4 −4.3191×E−0
C6 −1.8563×E−0
C8 +3.0372×E−1
C10 +1.4514×E−1

No. 3 surface
Aspherical Surface Co-Efficient

| | | | |
|---|---|---|---|
| κ | $-8.1183 \times E + 1$ | | |
| A1 | $+2.6945 \times E - 3$ | P1 | 4.0 |
| A2 | $+1.0688 \times E - 2$ | P2 | 6.0 |
| A3 | $-1.6756 \times E - 2$ | P3 | 8.0 |
| A4 | $+1.0634 \times E - 2$ | P4 | 10.0 |
| A5 | $-3.2442 \times E - 3$ | P5 | 12.0 |
| A6 | $+3.8176 \times E - 4$ | P6 | 14.0 |

EXAMPLE 3

In the present example, on the light source side of the objective lens, there are formed the inner optical function area having the diffractive structure, the intermediate optical function area provided with the diffractive structure which gives the under spherical aberration to the passing light flux, and the outer optical function area provided with the diffractive structure.

Figure 7:
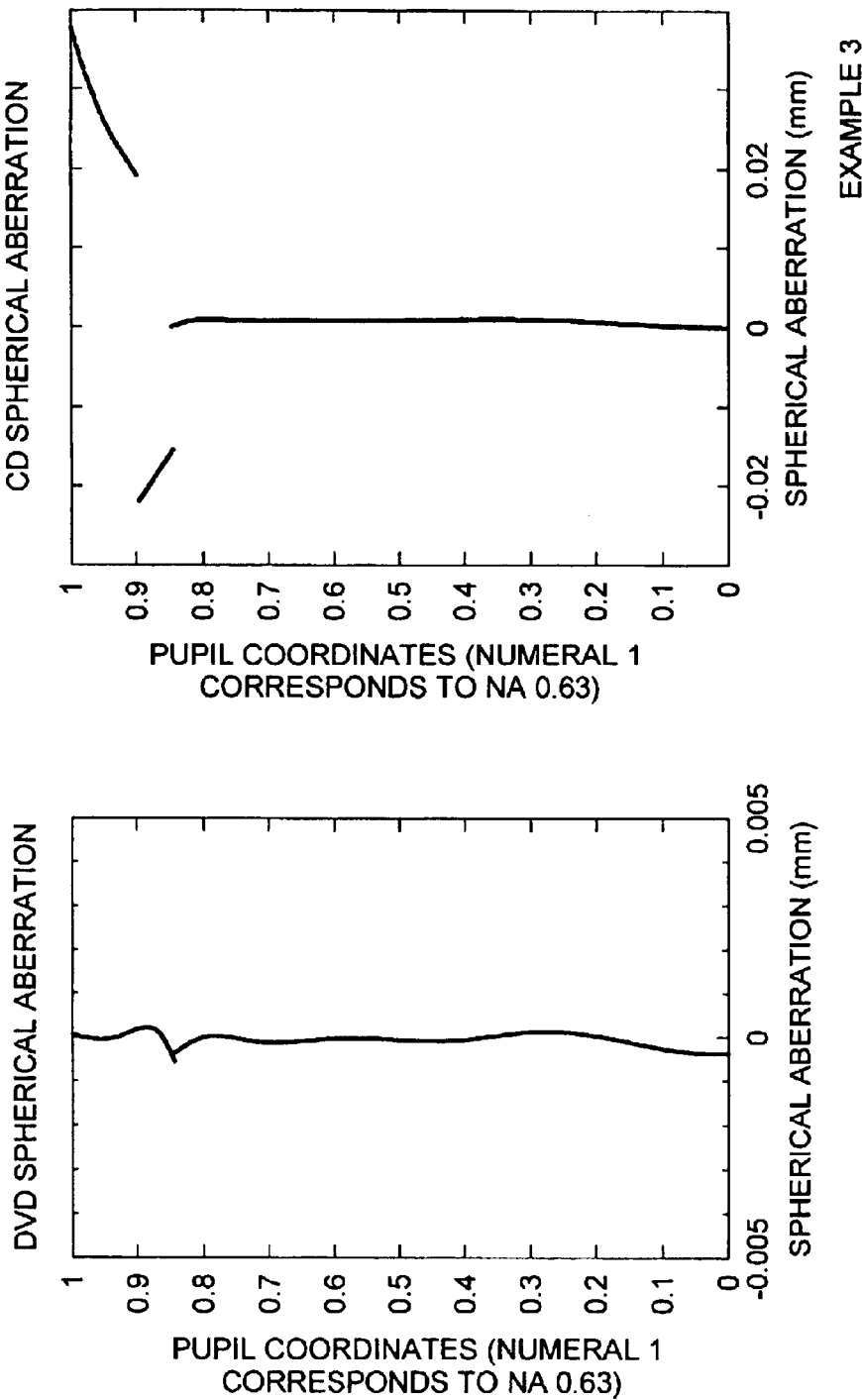
FIG. 7 is a spherical aberration diagram relating to an objective lens of Example 3.

The lens data of the objective lens relating to the present example is shown in Table 4. Further, for DVD and CD respectively, the spherical aberration drawings of the objective lens of the present example are shown in FIG. 7. The amount of the wave-front aberration of the objective lens of the present invention is 0.004 λ1 rms when DVD is used, while 0.001×λ2 rms when CD is used.

TABLE 4

Example 3 lens data
$f_1 = 3.36$ mm, $f_2 = 3.38$ mm
NA1: 0.63, NA2: 0.53

| No. i surface | ri | di (655 nm) | ni (655 nm) | di (785 nm) | ni (785 nm) | |
|---|---|---|---|---|---|---|
| 0 | ∞ | | | | | |
| 1 | ∞ | 0.0 | 1.0 | 0.0 | 1.0 | diameter of diaphragm: 4.234 mm |
| 2 | 2.107069 | 2.20000 | 1.54094 | 2.20000 | 1.53716 | |
| 2' | 2.066593 | 2.18768 | 1.54094 | 2.18768 | 1.53716 | |
| 2" | 2.114199 | 2.19879 | 1.54094 | 2.19879 | 1.53716 | |
| 3 | −8.379737 | 1.74850 | 1.0 | 1.38494 | 1.0 | |
| 4 | ∞ | 0.6 | 1.57752 | 1.2 | 1.57063 | |
| 5 | ∞ | | | | | |

Aspherical Surface Data
No. 2 surface (0 <h<1.790 mm: DVD/CD common area)
Aspherical Surface Co-Efficient

| | | | |
|---|---|---|---|
| κ | $-2.4825 \times E - 0$ | | |
| A1 | $+2.5739 \times E - 2$ | P1 | 4.0 |
| A2 | $-3.2414 \times E - 3$ | P2 | 6.0 |
| A3 | $+4.2837 \times E - 4$ | P3 | 8.0 |
| A4 | $-3.3952 \times E - 5$ | P4 | 10.0 |

Optical path difference function (co-efficient of optical path difference function: standard wavelength 730 nm)

C4 −1.5647×E−0
C6 −2.0306×E−1
C8 +1.8281×E−2
C10 −3.3718×E−3

No. 2' surface (1.790 mm<h<1.900 mm: DVD exclusive area)
Aspherical Surface Co-Efficient

| | | | |
|---|---|---|---|
| κ | $-3.5921 \times E - 1$ | | |
| A1 | $-1.8478 \times E - 3$ | P1 | 4.0 |
| A2 | $-1.7288 \times E - 3$ | P2 | 6.0 |
| A3 | $+1.2746 \times E - 4$ | P3 | 8.0 |
| A4 | $-4.9017 \times E - 5$ | P4 | 10.0 |

Optical path difference function (co-efficient of optical path difference function: standard wavelength 655 nm)

C2 +3.0255×E+1
C4 −2.4157×E+1
C6 +8.6161×E−0
C8 −1.7355×E−0
C10 +1.2560×E−1

No. 2" surface (1.900 mm<h: DVD exclusive area)
Aspherical Surface Co-Efficient

| | | | |
|---|---|---|---|
| κ | $-3.2013 \times E - 1$ | | |
| A1 | $-3.8672 \times E - 3$ | P1 | 4.0 |
| A2 | $-1.0563 \times E - 3$ | P2 | 6.0 |
| A3 | $+2.9225 \times E - 4$ | P3 | 8.0 |
| A4 | $-6.5730 \times E - 5$ | P4 | 10.0 |

Optical path difference function (co-efficient of optical path difference function: standard wavelength 655 nm)

C2 +1.5661×E+1
C4 −2.1835×E+1
C6 +8.9554×E−0
C8 −1.7327×E−0
C10 +1.2618×E−1

No. 3 surface
Aspherical Surface Co-Efficient

| | | | |
|---|---|---|---|
| κ | $-1.4701 \times E + 1$ | | |
| A1 | $+1.9783 \times E - 2$ | P1 | 4.0 |
| A2 | $-1.2392 \times E - 2$ | P2 | 6.0 |
| A3 | $+5.4733 \times E - 3$ | P3 | 8.0 |

-continued

| A4 | −1.4815 × E − 3 | P4 | 10.0 |
| A5 | +2.0990 × E − 4 | P5 | 12.0 |
| A6 | −1.1917 × E − 5 | P6 | 14.0 |

EXAMPLE 4

In the present example, on the light source side of the objective lens, there are formed the inner optical function area having the diffractive structure, the intermediate optical function area provided with the refractive surface, and the outer optical function area provided with the diffractive structure.

Figure 8:
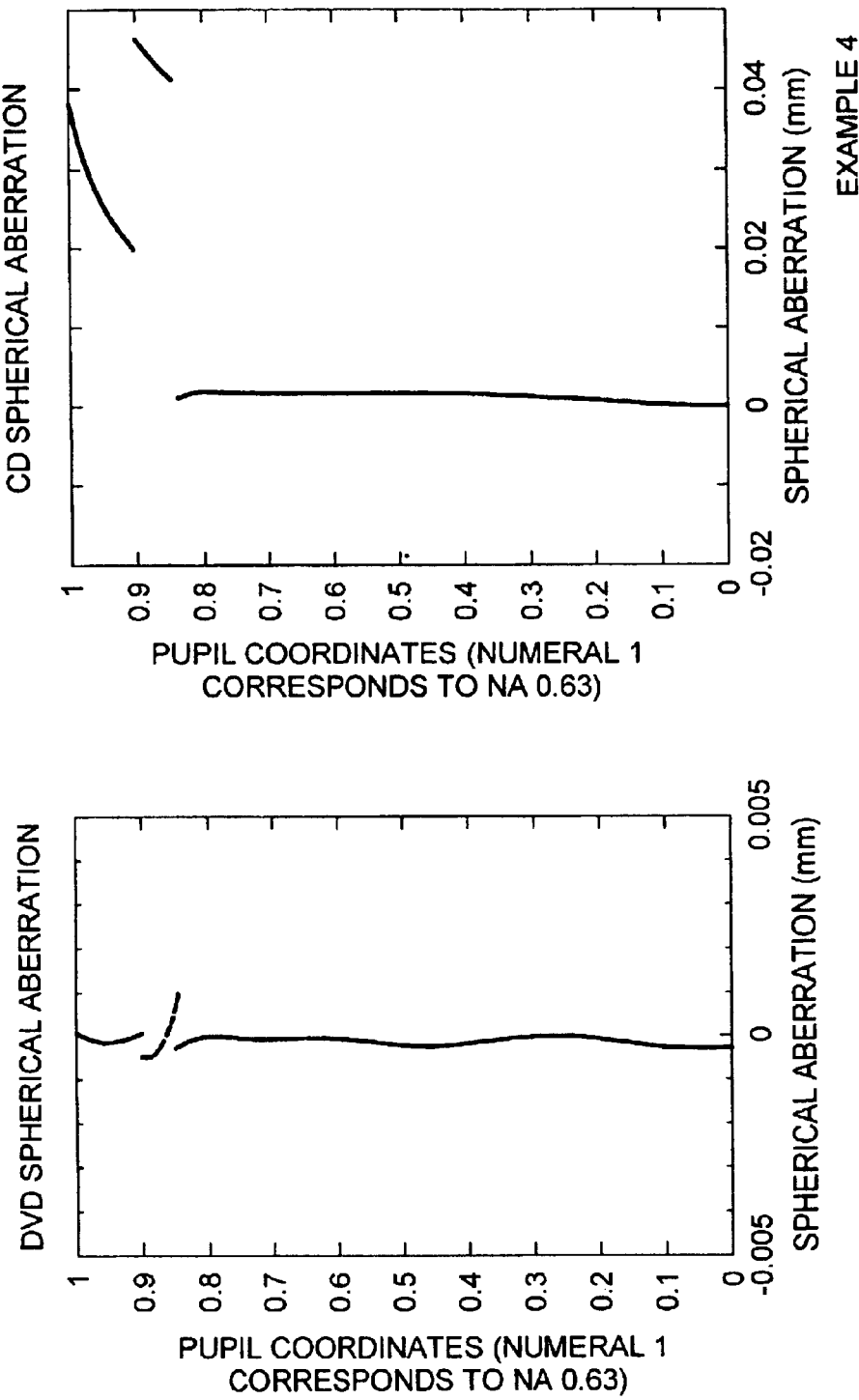
FIG. 8 is a spherical aberration diagram relating to an objective lens of Example 4.

The lens data of the objective lens relating to the present example is shown in Table 5. Further, for DVD and CD respectively, the spherical aberration drawings of the objective lens of the present example are shown in FIG. 8. The amount of the wave-front aberration of the objective lens of the present invention is 0.004 $\lambda 1$ rms when DVD is used, while 0.001 $\lambda 2$ rms when CD is used.

TABLE 5

Example 4 lens data
$f_1 = 3.37$ mm, $f_2 = 3.39$ mm
NA1: 0.63, NA2: 0.53

| No. i surface | ri | di (655 nm) | ni (655 nm) | di (785 nm) | ni (785 nm) | |
|---|---|---|---|---|---|---|
| 0 | ∞ | | | | | |
| 1 | ∞ | 0.0 | 1.0 | 0.0 | 1.0 | diameter of diaphragm: 4.234 mm |
| 2 | 2.107069 | 2.20000 | 1.54094 | 2.20000 | 1.53716 | |
| 2' | 2.119992 | 2.19291 | 1.54094 | 2.19291 | 1.53716 | |
| 2" | 2.114199 | 2.19879 | 1.54094 | 2.19879 | 1.53716 | |
| 3 | −8.379737 | 1.74850 | 1.0 | 1.38494 | 1.0 | |
| 4 | ∞ | 0.6 | 1.57752 | 1.2 | 1.57063 | |
| 5 | ∞ | | | | | |

Aspherical Surface Data

No. 2 surface (0<h<1.790 mm: DVD/CD common area)
Aspherical Surface Co-Efficient

| κ | −2.4825 × E − 0 | | |
| A1 | +2.5739 × E − 2 | P1 | 4.0 |
| A2 | −3.2414 × E − 3 | P2 | 6.0 |
| A3 | +4.2837 × E − 4 | P3 | 8.0 |
| A4 | −3.3952 × E − 5 | P4 | 10.0 |

Optical path difference function (co-efficient of optical difference function: standard wavelength 730 nm)

C4 −1.5647×E−0

C6 −2.0306×E−1

C8 +1.8281×E−2

C10 −3.3718×E−3

No. 2' surface (1.790 mm<h<1.900 mm: DVD exclusive area)

Aspherical Surface Co-Efficient

| κ | −3.6964 × E − 1 | | |
| A1 | −7.7766 × E − 4 | P1 | 4.0 |
| A2 | −1.2241 × E − 3 | P2 | 6.0 |
| A3 | +3.9564 × E − 4 | P3 | 8.0 |
| A4 | −6.1416 × E − 5 | P4 | 10.0 |
| A5 | −1.3026 × E − 6 | P5 | 12.0 |

No. 2" surface (1.900 mm<h: DVD exclusive area)

Aspherical Surface Co-Efficient

| κ | −3.2013 × E − 1 | | |
| A1 | −3.8672 × E − 3 | P1 | 4.0 |
| A2 | −1.0563 × E − 3 | P2 | 6.0 |
| A3 | +2.9225 × E − 4 | P3 | 8.0 |
| A4 | −6.5730 × E − 5 | P4 | 10.0 |

Optical path difference function (co-efficient of optical path difference function: standard wavelength 655 nm)

C2 +1.5661×E+1

C4 −2.1835×E+1

C6 +8.9554×E−0

C8 −1.7327×E−0

C10 +1.2618×E−1

No. 3 surface

Aspherical Surface Co-Efficient

| κ | −1.4701 × E + 1 | | |
| A1 | +1.9783 × E − 2 | P1 | 4.0 |
| A2 | −1.2392 × E − 2 | P2 | 6.0 |
| A3 | +5.4733 × E − 3 | P3 | 8.0 |
| A4 | −1.4815 × E − 3 | P4 | 10.0 |
| A5 | +2.0990 × E − 4 | P5 | 12.0 |
| A6 | −1.1917 × E − 5 | P6 | 14.0 |

EXAMPLE 5

In the present example, on the light source side of the objective lens, there are formed the inner optical function area having the diffractive structure, the intermediate optical function area provided with the diffractive structure which gives the under spherical aberration to the passing light flux, and the outer optical function area provided with the diffractive structure.

Figure 9:
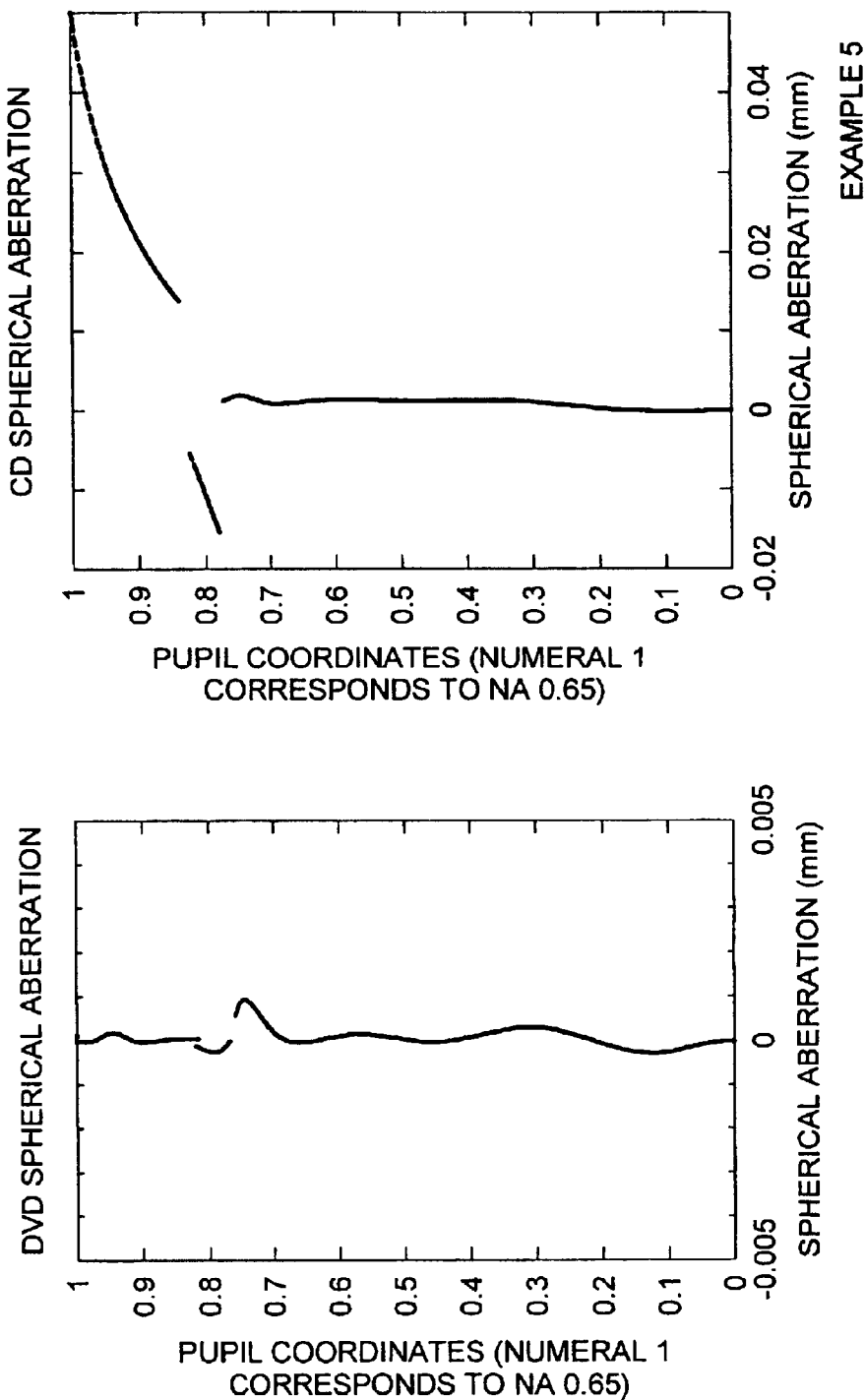
FIG. 9 is a spherical aberration diagram relating to an objective lens of Example 5.

The lens data of the objective lens relating to the present example is shown in Table 6. Further, for DVD and CD respectively, the spherical aberration drawings of the objective lens of the present example are shown in FIG. 9. The amount of the wave-front aberration of the objective lens of the present invention is 0.004 $\lambda 1$ rms when DVD is used, while 0.001 $\lambda 2$ rms when CD is used.

TABLE 6

Example 5 lens data
$f_1 = 3.22$ mm, $f_2 = 3.24$ mm
NA1: 0.65,   NA2: 0.50

| No. i surface | ri | di (660 nm) | ni (660 nm) | di (785 nm) | ni (785 nm) | |
|---|---|---|---|---|---|---|
| 0 | ∞ | | ∞ | | | |
| 1 | ∞ | 0.0 | 1.0 | 0.0 | 1.0 | diameter of diaphragm: 4.186 mm |
| 2 | 1.965694 | 1.94000 | 1.52897 | 1.94000 | 1.52541 | |
| 2' | 1.864133 | 2.18768 | 1.52897 | 2.18768 | 1.52541 | |
| 2" | 1.869912 | 1.95631 | 1.52897 | 1.95631 | 1.52541 | |
| 3 | −8.402408 | 1.74031 | 1.0 | 1.37511 | 1.0 | |
| 4 | ∞ | 0.6 | 1.57718 | 1.2 | 1.57063 | |
| 5 | ∞ | | | | | |

Aspherical Surface Data

No. 2 surface (0<h<1.620 mm: DVD/CD common area)

Aspherical Surface Co-Efficient

| κ | −1.7051 × E − 0 | | |
|---|---|---|---|
| A1 | +1.8305 × E − 2 | P1 | 4.0 |
| A2 | −2.3146 × E − 3 | P2 | 6.0 |
| A3 | +2.5402 × E − 3 | P3 | 8.0 |
| A4 | −2.3158 × E − 3 | P4 | 10.0 |
| A5 | +1.0966 × E − 3 | P5 | 12.0 |
| A6 | −2.6244 × E − 4 | P6 | 14.0 |
| A7 | +2.5384 × E − 4 | P7 | 16.0 |

Optical path difference function (co-efficient of optical path difference function: standard wavelength 720 nm)

C4 −2.3360×E−0
C6 +1.5255×E−1
C8 −1.5308×E−1
C10 +1.8910×E−2

No. 2' surface (1.620 mm<h<1.720 mm: DVD exclusive area)

Aspherical Surface Co-Efficient

| κ | −3.8665 × E − 1 | | |
|---|---|---|---|
| A1 | −9.1003 × E − 3 | P1 | 4.0 |
| A2 | −8.3181 × E − 3 | P2 | 6.0 |
| A3 | +2.8570 × E − 3 | P3 | 8.0 |
| A4 | +6.7613 × E − 5 | P4 | 10.0 |
| A5 | −3.2311 × E − 4 | P5 | 12.0 |
| A6 | +8.7877 × E − 5 | P6 | 14.0 |
| A7 | −7.9959 × E − 6 | P7 | 16.0 | optical path difference function (co-efficient of optical path difference function: standard wavelength 660 nm)

C2 +2.9740×E+1
C4 −1.9454×E+1
C6 +1.4762×E−0
C8 +3.6426×E−1
C10 −3.1548×E−2

No. 2" surface (1.720 mm<h: DVD exclusive area)
Aspherical Surface Co-Efficient

| κ | −3.8630 × E − 1 | | |
|---|---|---|---|
| A1 | −3.6881 × E − 3 | P1 | 4.0 |
| A2 | −7.6396 × E − 3 | P2 | 6.0 |
| A3 | +2.7410 × E − 3 | P3 | 8.0 |
| A4 | +1.3137 × E − 5 | P4 | 10.0 |
| A5 | −3.2928 × E − 4 | P5 | 12.0 |
| A6 | +8.8661 × E − 5 | P6 | 14.0 |
| A7 | −7.7648 × E − 6 | P7 | 16.0 | optical path difference function (co-efficient of optical path difference function: standard wavelength 660 nm)

C2 −4.3081×E−0
C4 −3.3440×E−1
C6 +4.4978×E−1
C8 −3.6431×E−1
C10 +5.2991×E−2

No. 3 surface
Aspherical Surface Co-Efficient

| κ | −1.4701 × E+1 | | |
|---|---|---|---|
| A1 | +1.9783 × E−2 | P1 | 4.0 |
| A2 | −1.2392 × E−2 | P2 | 6.0 |
| A3 | +5.4733 × E−3 | P3 | 8.0 |
| A4 | −1.4815 × E−3 | P4 | 10.0 |
| A5 | +2.0990 × E−4 | P5 | 12.0 |
| A6 | −1.1917 × E−5 | P6 | 14.0 |

As mentioned above, the present examples can provide the objective lens having higher function, because the present examples can establish the spherical aberration of the light flux passing through the intermediate optical function area optionally so that the absolute value of the spherical aberration of the light flux arriving at CD after passing through the intermediate optical function when conducting the information recording or reproduction for CD, for example, is greater than the absolute value of the spherical aberration of the light flux arriving at CD after passing through the inner optical function area when conducting the information recording or reproduction for CD.

The present invention can provide the objective lens for the optical pick-up device and the optical pick-up device which can perform the information recording or reproduction for the different optical information recording media appropriately, though the structure is simple.

What is claimed is:

1. An objective lens for use in an optical pickup apparatus which comprises a first light source to emit a light flux having a wavelength $\lambda 1$ for conducting recording and/or reproducing information for a first optical information recording medium with a transparent substrate having a thickness t1, a second light source to emit a light flux having a wavelength $\lambda 2$ ($\lambda 1 < \lambda 2$) for conducting recording and/or reproducing information for a second optical information recording medium with a transparent substrate having a thickness t2 (t1<t2), a light converging optical system including a objective lens to converge a light flux emitted from the first and second light sources onto an information recording plane through a respective transparent substrate of the first and second optical information recording media, and a photodetector, the objective lens comprising:

plural optical functional regions arranged in a direction perpendicular to an optical axis, the plural optical functional regions including an inside optical functional region closer to the optical axis, an outside optical functional region farther from the optical axis and an intermediate optical functional region provided between the inside and outside optical functional regions; and diffractive structures provided on the inside and outside optical functional regions respectively;

wherein a spherical aberration of a light flux having passed through the inside optical functional region is corrected when recording and/or reproducing information is conducted for the first and second optical information recording media, wherein a spherical aberration of a light flux having passed through the outside optical functional region is corrected when recording and/or reproducing information is conducted for the first optical information recording medium and a light flux having passed through the outside optical functional region is made to be flare when recording and/or reproducing information is conducted for the second optical information recording medium, wherein a spherical aberration of a light flux having passed through the intermediate optical functional region is made to be discontinuous to a spherical aberration of a light flux having passed through the outside optical functional region when recording and/or reproducing information is conducted for the second optical information recording medium, wherein the absolute value of an amount of a spherical aberration of a light flux coming to the second optical information recording medium after having passed through the intermediate optical functional region is made larger than that of an amount of a spherical aberration of a light flux coming to the second optical information recording medium after having passed through the inside optical functional region when recording and/or reproducing information is conducted for the second optical information recording medium, and wherein the following formula is satisfied:

$$-0.1 < m1 < 0.1$$

where m1 is a magnification of the objective lens when recording and/or reproducing information is conducted for the first optical information recording medium.

2. The objective lens of claim 1, wherein the following formula is satisfied:

$$|m1-m2|<0.05$$

where m2 is a magnification of the objective lens when recording and/or reproducing information is conducted for the second optical information recording medium.

3. The objective lens of claim 1, wherein the following formula is satisfied:

$$|SA_1|<0.01\lambda 1 rms$$

where $SA_1$ is a wavefront aberration of a first effective light flux emitted from the first light source when recording and/or reproducing information is conducted for the first optical information recording medium.

4. The objective lens of claim 1, wherein the following formula is satisfied:

$$|SA_2|<0.01\lambda 2 rms$$

where $SA_2$ is a wavefront aberration of a second effective light flux emitted from the second light source when recording and/or reproducing information is conducted for the second optical information recording medium.

5. The objective lens of claim 1, wherein the following formula is satisfied:

$$|LSA_2h_2|+|LSA_1h_2|<0.01mm$$

where $LSA_2h_2$ is an amount of a longitudinal spherical aberration of a light ray having passed through an outermost section of the second effective light flux when recording and/or reproducing information is conducted for the second optical information recording medium, and $LSA_1h_2$ is an amount of a longitudinal spherical aberration of a light ray having passed through an outermost section of the second effective light flux when recording and/or reproducing information is conducted for the first optical information recording medium.

6. The objective lens of claim 1, wherein a light flux having passed through the intermediate optical functional region is made to be flare when recording and/or reproducing information is conducted for the second optical information recording medium.

7. The objective lens of claim 1, wherein a light flux having passed through the intermediate optical functional region has an under spherical aberration when recording and/or reproducing information is conducted for the second optical information recording medium.

8. The objective lens of claim 1, wherein a spherical aberration of a light flux having passed through the intermediate optical functional region is corrected when recording and/or reproducing information is conducted for the first optical information recording medium.

9. An optical pickup apparatus, comprising:

a first light source to emit a light flux having a wavelength $\lambda 1$ for conducting recording and/or reproducing information for a first optical information recording medium with a transparent substrate having a thickness t1; a second light source to emit a light flux having a wavelength $\lambda 2$ ($\lambda 1 < \lambda 2$) for conducting recording and/or reproducing information for a second optical information recording medium with a transparent substrate having a thickness t2 (t1<t2);

a light converging optical system including a objective lens to converge a light flux emitted from the first and second light sources onto an information recording plane through a respective transparent substrate of the first and second optical information recording media; and a photodetector, and the objective lens comprising:

plural optical functional regions arranged in a direction perpendicular to an optical axis, the plural optical functional regions including an inside optical functional region closer to the optical axis, an outside optical functional region farther from the optical axis and an intermediate optical functional region provided between the inside and outside optical functional regions; and diffractive structures provided on the inside and outside optical functional regions respectively;

wherein a spherical aberration of a light flux having passed through the inside optical functional region is corrected when recording and/or reproducing information is conducted for the first and second optical information recording media, wherein a spherical aberration of a light flux having passed through the outside optical functional region is corrected when recording and/or reproducing information is conducted for the first optical information recording medium and a light flux having passed through the outside optical functional region is made to be flare when recording and/or reproducing information is conducted for the second optical information recording medium, wherein a spherical aberration of a light flux having passed through the intermediate optical functional region is made to be discontinuous to a spherical aberration of a light flux having passed through the outside optical functional region when recording and/or reproducing information is conducted for the second optical information recording medium, wherein the absolute value of an amount of a spherical aberration of a light flux coming to the second optical information recording medium after having passed through the intermediate optical functional region is made larger than that of an amount of a spherical aberration of a light flux coming to the second optical information recording medium after having passed through the inside optical functional region when recording and/or reproducing information is conducted for the second optical information recording medium, and wherein the following formula is satisfied:

$$-0.1 < m1 < 0.1$$

where m1 is a magnification of the objective lens when recording and/or reproducing information is conducted for the first optical information recording medium.

10. The optical pickup apparatus of claim 9, wherein the following formula is satisfied:

$$|m1-m2|<0.05$$

where m2 is a magnification of the objective lens when recording and/or reproducing information is conducted for the second optical information recording medium.

11. The optical pickup apparatus of claim 9, wherein the following formula is satisfied:

$$|SA_1|<0.01\lambda1\text{rms}$$

where $SA_1$ is a wavefront aberration of a first effective light flux emitted from the first light source when recording and/or reproducing information is conducted for the first optical information recording medium.

12. The optical pickup apparatus of claim 9, wherein the following formula is satisfied:

$$|SA_2|<0.01\lambda2\text{rms}$$

where $SA_1$ is a wavefront aberration of a second effective light flux emitted from the second light source when recording and/or reproducing information is conducted for the second optical information recording medium.

13. The optical pickup apparatus of claim 9, wherein the following formula is satisfied:

$$|LSA_2h_2|+|LSA_1h_2|<0.01\text{mm}$$

where $LSA_2h_2$ is an amount of a longitudinal spherical aberration of a light ray having passed through an outermost section of the second effective light flux when recording and/or reproducing information is conducted for the second optical information recording medium, and $LSA_1h_2$ is an amount of a longitudinal spherical aberration of a light ray having passed through an outermost section of the second effective light flux when recording and/or reproducing information is conducted for the first optical information recording medium.

14. The optical pickup apparatus of claim 9, wherein a light flux having passed through the intermediate optical functional region is made to be flare when recording and/or reproducing information is conducted for the second optical information recording medium.

15. The optical pickup apparatus of claim 9, wherein a light flux having passed through the intermediate optical functional region has an under spherical aberration when recording and/or reproducing information is conducted for the second optical information recording medium.

16. The optical pickup apparatus of claim 9, wherein a spherical aberration of a light flux having passed through the intermediate optical functional region is corrected when recording and/or reproducing information is conducted for the first optical information recording medium.

* * * * *